United States Patent
Lee

(10) Patent No.: US 12,550,478 B2
(45) Date of Patent: Feb. 10, 2026

(54) MANUFACTURING METHOD OF DISPLAY DEVICE

(71) Applicant: Samsung Display Co., LTD., Yongin-si (KR)

(72) Inventor: Jong Suk Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 411 days.

(21) Appl. No.: 18/343,989

(22) Filed: Jun. 29, 2023

(65) Prior Publication Data

US 2024/0072197 A1 Feb. 29, 2024

(30) Foreign Application Priority Data

Aug. 26, 2022 (KR) .................. 10-2022-0107781

(51) Int. Cl.
*H10H 20/01* (2025.01)
(52) U.S. Cl.
CPC .................. *H10H 20/01* (2025.01)
(58) Field of Classification Search
CPC .................................................... H10H 20/01
See application file for complete search history.

(56) References Cited

U.S. PATENT DOCUMENTS

| 9,981,417 | B2 * | 5/2018 | Park ..................... B29C 51/30 |
| 11,251,395 | B2 * | 2/2022 | Sim ..................... H10K 59/131 |
| 12,123,373 | B2 * | 10/2024 | Muldoon ................. F02C 7/36 |
| 2016/0001521 | A1 * | 1/2016 | Tanaka ............... B32B 37/1292 156/60 |
| 2021/0166959 | A1 * | 6/2021 | Choi ..................... H01L 21/52 |
| 2023/0015869 | A1 | 1/2023 | Lee et al. |

FOREIGN PATENT DOCUMENTS

| KR | 10-2015-0116023 | 10/2015 |
| KR | 10-2019-0124358 | 11/2019 |
| KR | 10-2022-0050299 | 4/2022 |
| KR | 10-2023-0013731 | 1/2023 |

* cited by examiner

*Primary Examiner* — Mounir S Amer
(74) *Attorney, Agent, or Firm* — Lerner David LLP

(57) ABSTRACT

A manufacturing method of a display device includes providing a guide film wound around a first roller, positioning an attachment area of the guide film to overlap a display panel, bonding the guide film and the display panel, positioning the display panel bonded to the guide film to overlap a cover window, bonding the display panel and the cover window, separating the guide film from the display panel, and winding the guide film around a second roller by at least an area corresponding to the attachment area.

20 Claims, 15 Drawing Sheets

MANUFACTURING METHOD OF DISPLAY DEVICE

CROSS-REFERENCE TO RELATED APPLICATION(S)

This application claims priority to and benefits of Korean Patent Application No. 10-2022-0107781 under 35 U.S.C. § 119, filed in the Korean Intellectual Property Office on Aug. 26, 2022, the entire contents of which are incorporated herein by reference.

BACKGROUND

1. Technical Field

This disclosure relates to a method for bonding a display panel and a cover window using a guide film.

2. Description of the Related Art

A display device such as a light emitting diode display or a liquid crystal display may be applied to an electronic device such as a smart phone, a mobile phone, or a multimedia player. Since the display device, particularly a screen of the display device, is an external part of an electronic device (i.e., externally viewable), the display device is a key element in a design of the electronic device.

Typically, the screen of the display device is flat. Recently, as a flexible display device has been developed, the screen is not limited to a flat surface, but may be formed in a curved surface and may include a bending region. In particular, when an edge of the display device is formed as a curved surface, a screen-to-body ratio of the display device may be increased. The screen-to-body ratio reflects a technical level of the display device, and at the same time, it may be an important factor for a consumer to select a product. The curved edge may provide a more improved grip than an angled edge.

The above information disclosed in this Background section is only for enhancement of understanding of the background, and therefore, it may contain information that does not form the prior art that is already known in this country to a person of ordinary skill in the art.

SUMMARY

A guide film may be used in manufacturing a display device. Embodiments have been made in an effort to provide a manufacturing method of a display device, capable of reducing consumption of a guide film and reducing process time and cost.

A manufacturing method of a display device according to an embodiment may include providing a guide film wound around a first roller, positioning an attachment area of the guide film to overlap a display panel, bonding the guide film and the display panel, positioning the display panel bonded to the guide film to overlap a cover window, bonding the display panel and the cover window, separating the guide film from the display panel, and winding the guide film around a second roller by at least an area corresponding to the attachment area.

The guide film may include a first film layer, a second film layer, and an adhesive layer between the first film layer and the second film layer. The positioning of the attachment area to overlap the display panel may include removing the second film layer from the attachment area.

The second film layer may be removably cut in a cell unit.

The guide film may include a main area corresponding to the attachment area, a first subarea disposed at a first side of the main area, and a second subarea disposed at a second side of the main area. The second film layer may not be disposed in the main area and the second subarea.

An adhesive force of the adhesive layer may be reduced or eliminated in the second subarea.

The manufacturing method may further include removing the second film layer from the first subarea adjacent to the main area after the winding of the guide film around the second roller.

The first subarea from which the second film layer is removed may be used as an attachment area of another display panel.

The separating of the guide film from the display panel may include irradiating ultraviolet rays to the main area. An ultraviolet irradiation area may be set such that the ultraviolet rays are not irradiated to the first subarea in the irradiating of the ultraviolet rays.

The bonding of the display panel and the cover window may include positioning the display panel bonded to the guide film on a pad, and fixing the cover window to a jig.

The bonding of the display panel and the cover window may include preforming the display panel by applying an external force to the guide film.

A manufacturing method of a display device according to an embodiment may include providing a guide film, including a first film layer, an adhesive layer, and a second film layer, wound around a first roller, physically connecting a first end of the guide film with a second roller, bonding a first attachment area of the guide film to a first display panel, bonding the first display panel bonded to the guide film to a first cover window, separating the guide film from the first display panel, and winding a portion of the guide film around the second roller.

The manufacturing method may further include bonding a second attachment region of the guide film to a second display panel after the winding of the portion of the guide film around the second roller.

The second film layer may be removably cut in a cell unit corresponding to the first display panel.

The guide film may include a main area corresponding to the first attachment area, a first subarea extending from a first side of the main area, and a second subarea extending from a second side of the main area, and The second film layer may not be disposed in the main area and the second subarea.

An adhesive force of the adhesive layer may be reduced or eliminated in the second subarea.

The manufacturing method may further include removing the second film layer from the first subarea adjacent to the main area after the winding of the portion of the guide film around the second roller.

The first subarea from which the second film layer is removed may be used as a second attachment area for bonding a second display panel.

The separating of the guide film from the first display panel may include irradiating ultraviolet rays to the main area. An ultraviolet irradiation area may be set such that the ultraviolet rays are not irradiated to the first subarea in the irradiating of the ultraviolet rays.

The bonding of the first display panel and the first cover window may include positioning the first display panel bonded to the first attachment area on a pad, and fixing the first cover window to a jig.

The bonding of the first display panel and the first cover window may include preforming the display panel by applying an external force to the guide film.

According to the embodiments, it is possible to provide a manufacturing method of a display device, capable of reducing consumption of a guide film and reducing process time and cost. Further, according to the embodiments, there are other advantageous effects that can be recognized throughout the specification.

DETAILED DESCRIPTION OF THE EMBODIMENTS

Figure 1:
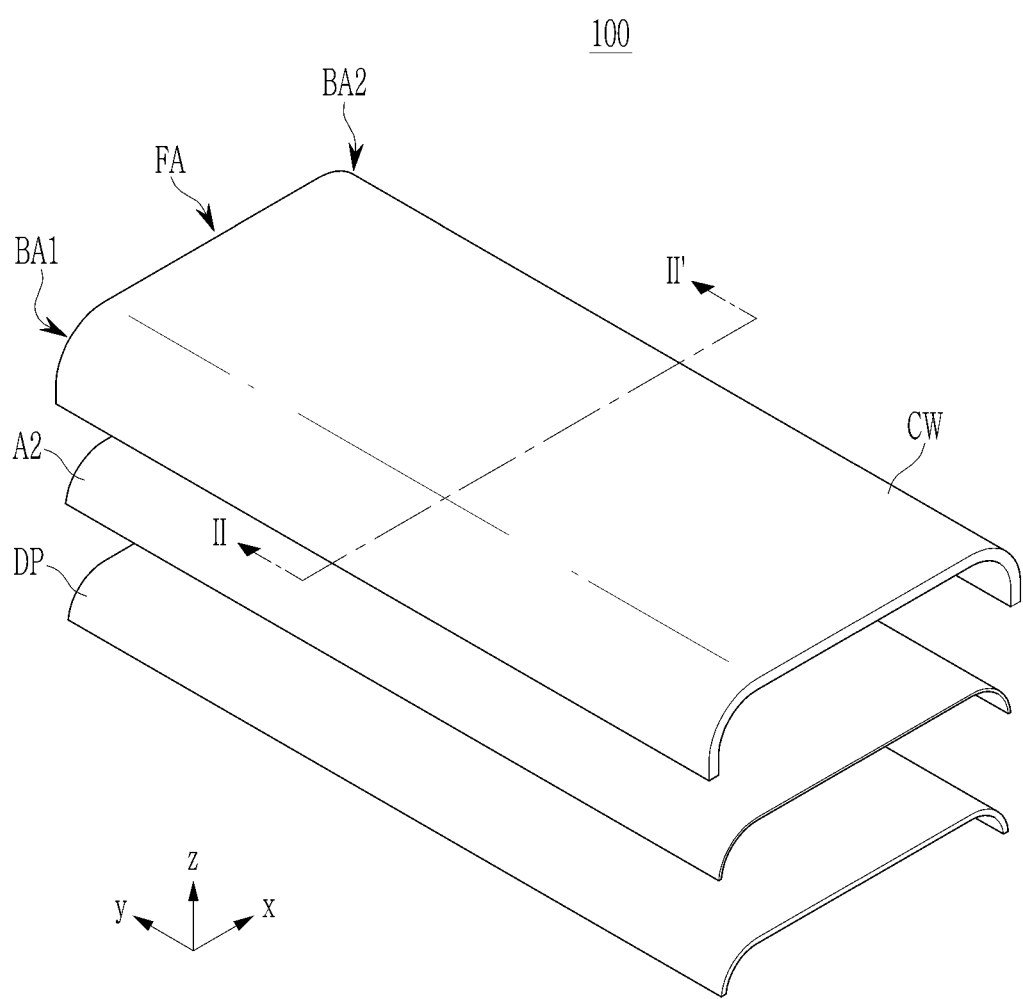
FIG. 1 illustrates an exploded schematic perspective view of a display device according to an embodiment.

This disclosure will be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Further, sizes and thicknesses of constituent elements shown in the accompanying drawings may be arbitrarily given for better understanding and ease of description.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean any combination including "A, B, or A and B."

It will be understood that when an element such as a layer, film, area, or substrate is referred to as being "on" another element, it can be directly on the other element or intervening elements may also be present. In contrast, when an element is referred to as being "directly on" another element, there may be no intervening elements present.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

It will be understood that when an element (or a region, a layer, a portion, or the like) is referred to as "connected to" or "coupled to" another element in the specification, it can be directly connected or coupled to another element mentioned above, or intervening elements may be disposed therebetween. It will be understood that the terms "connected to" or "coupled to" may include a physical or electrical connection or coupling.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as "not overlapping" or to "not overlap" another element, this may include that the elements are spaced apart from each other, offset from each other, or set aside from each other or any other suitable term as would be appreciated and understood by those of ordinary skill in the art.

In the drawings, signs "x", "y", and "z" may be used to indicate directions, wherein x may be used for indicating a first direction, y may be used for indicating a second direction that is perpendicular to the first direction, and z may be used for indicating a third direction that is perpendicular to the first direction and the second direction.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
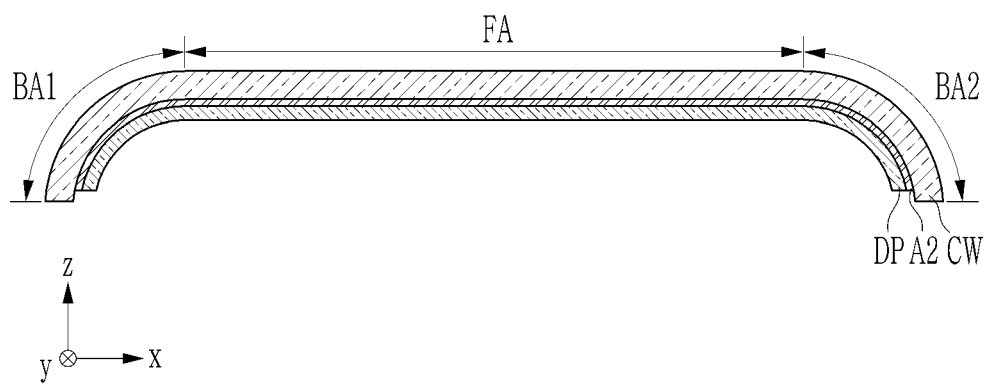
FIG. 2 illustrates a schematic cross-sectional view taken along line II-IF of FIG. 1.

FIG. 1 illustrates an exploded schematic perspective view of a display device according to an embodiment, and FIG. 2 illustrates a schematic cross-sectional view taken along line II-II' of FIG. 1.

Referring to FIG. 1 and FIG. 2, the display device 100 may include a display panel DP and a cover window CW positioned in front of the display panel DP. The display device may be an electronic device such as a smart phone, a mobile phone, a tablet, a multimedia player, a portable information terminal, or a module used for such an electronic device. One or more of four edge areas of the display device may be bent. In the illustrated embodiment, the display device has a pair of opposite edge areas that are bent. In case of bending as described above, the display device may include a substantially flat area FA (or a front portion) and bent areas BA1 and BA2 (or side portions) positioned at opposite sides of the flat area. In the display device, the display panel DP and the cover window CW may each include a flat area FA and bending areas BA1 and BA2 corresponding to the flat area FA and the bending areas BA1 and BA2 of the display device.

In the display device, an image may be displayed by the display panel DP. The display panel DP may be a light emitting display panel including light emitting elements such as light emitting diodes. The display panel DP may be a touch screen panel including a touch sensor layer capable of sensing a touch. At least a portion of the display panel DP may be flexible. The display panel DP may include a display area corresponding to a screen on which an image is displayed and a non-display area in which no image is displayed.

Pixels may be arranged in the display area, and images may be displayed by a combination of pixels. Pixel circuits and signal lines for driving pixels may be positioned in the display area. The signal lines may include gate lines transferring gate signals, data lines transferring data signals, and the like. In the display area, the gate lines may extend in a first direction x, and the data lines may extend in a second direction y. Each of the pixels may be connected to a pixel circuit connected to a data line and a gate line to receive a data signal (voltage) controlling luminance of the pixel at predetermined or selected timing. The display area may be positioned not only in the flat area FA but also in the bending areas BA1 and BA2.

The non-display area may be positioned near an edge of the display panel DP, and may be positioned around the display area. Circuits and/or wires for generating and/or transferring various signals applied to the display area may be positioned, and a pad portion including pads for receiving signals from outside the display panel DP or outputting signals to the outside of the display panel DP may be positioned in the non-display area. A flexible printed circuit film (not illustrated) may be bonded to the pad portion.

Since opposite edge areas of the display panel DP may be bent, in case that the display device is viewed from the front, the non-display area may hardly be seen. Accordingly, a screen may occupy most of the area visible in case that the display device is viewed from the front, and a screen-to-body ratio of the display device may be maximized.

The cover window CW may cover the display panel DP and transmit an image displayed by the display panel DP. The display panel DP may be protected from an external environment, an impact, or the like. The cover window CW may serve as a support for maintaining a bent state of the display panel DP. The cover window CW may be formed of a transparent and hard material such as glass or plastic. At least an area of the cover window CW corresponding to a display screen may be optically transparent. Bending of the cover window CW may be performed, e.g., by thermoforming a glass plate, a plastic plate, or the like.

The display panel DP and the cover window CW may be bonded to each other. For example, a front surface of the display panel DP and a rear surface of the cover window CW may be bonded to each other. An adhesive such as an optically clear adhesive (OCA) may be used for bonding the display panel DP and the cover window CW, and an adhesive layer A2 formed as such an adhesive may be positioned between the display panel DP and the cover window CW.

Although not illustrated, the display device may further include a cover panel positioned on a rear surface of the display panel DP. The cover panel may protect the display panel DP from the rear environment (e.g., impact, electromagnetic waves, noise, etc.) of the display panel DP, and may include multiple functional layers. The cover panel may diffuse heat generated in the display panel DP, and in the electronic device, heat generated from a processor, a battery, a memory, etc. that may be positioned on the rear surface of the display panel DP may be prevented from being transferred to the display panel DP. The cover panel may be attached to the display panel DP by an adhesive layer that may be formed as an adhesive such as a pressure-sensitive adhesive (PSA).

Figure 3:
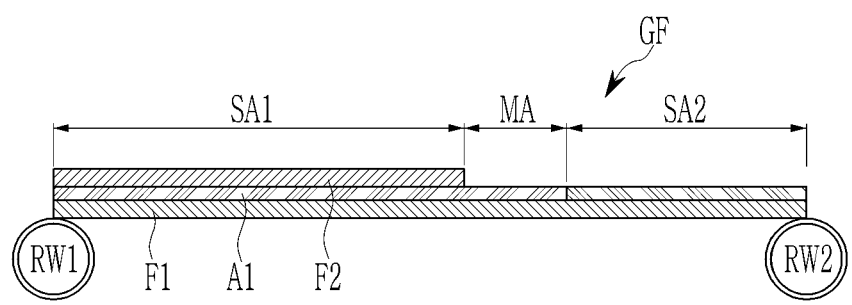
FIG. 3 and FIG. 4 each illustrate a schematic cross-sectional view showing a guide film according to an embodiment.
Figure 4:
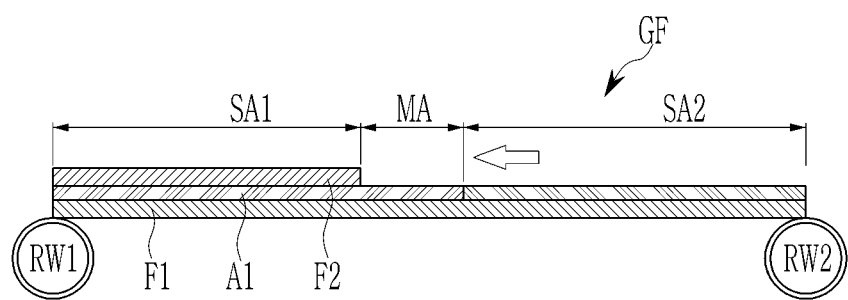

FIG. 3 and FIG. 4 each illustrate a schematic cross-sectional view showing a guide film according to an embodiment.

Referring to FIG. 3, a guide film GF that may be used in a process of bonding the display panel DP and the cover window CW is illustrated. The guide film GF may include a first film layer F1, an adhesive layer A1, and a second film layer F2. The adhesive layer A1 may be positioned between the first film layer F1 and the second film layer F2. The second film layer F2 may have a thickness that is equal to or thinner than that of the first film layer F1. The first film layer F1 and the second film layer F2 may each include a polymer such as polyethylene terephthalate (PET), poly(methyl methacrylate) (PMMA), polycarbonate (PC), triacetyl cellulose (TAC), and/or a cycloolefin polymer (COP). The adhesive layer A1 may include an adhesive such as an acryl adhesive, a silicone adhesive, and/or a urethane adhesive. The guide film GF may include a main area MA (or referred to as an attachment area) and subareas SA1 and SA2 (or referred to as non-attachment areas). The main area MA, which is an area bonded to the display panel DP, may include a first film layer F1 and an adhesive layer A1. In the main area MA, the second film layer F2 may be removed or peeled off. The subareas SA1 and SA2, which are areas that may not be bonded to the display panel DP, may respectively include a first subarea SA1 and a second sub area SA2 positioned at a first side (e.g., a left side) and a second side (e.g., a right side) of the main area MA. The first subarea SA1 may extend from a first edge of the main area MA, and the second subarea SA2 may extend from a second edge of the main area MA.

The first subarea SA1 may include all of the first film layer F1, the adhesive layer A1, and the second film layer F2. The adhesive layer A1 may be positioned between the first film layer F1 and the second film layer F2 so that an adhesive surface of the adhesive layer A1 may not be exposed. The second subarea SA2 may include the first film layer F1 and the adhesive layer A1, and the second film layer F2 may not be included or may be removed. In the second subarea SA2, the adhesive layer A1 may have lost or almost lost its adhesive force (been reduced or eliminated). Accordingly, even in case that an adhesive surface of the adhesive layer A1 is exposed in the second subarea SA2, it may not be adhered to a manufacturing device or other objects during the process.

The guide film GF may be of a roll type. Before using the guide film GF, the guide film GF may be entirely wound around a first roller RW1 (or a supply roller). In order to use the guide film GF, a starting end of the guide film GF may be connected to a second roller RW2 (or a recovery roller). In case that the guide film GF is used, a portion of the first subarea SA1 may be wound around the first roller RW1, and a portion of the second subarea SA2 may be wound around the second roller RW2 (or the recovery roller). The guide film GF may not be cut and used as a unit for manufacturing individual display devices, but may be continuously used in manufacturing multiple display devices. In the guide film GF, in case that a bonding process is completed and a next bonding process is performed, a portion wound around the first roller RW1 may decrease and a portion wound around the second roller RW2 may increase. In other words, the guide film GF may be unwound by the first roller RW1 and wound around the second roller RW2 whenever each display device is manufactured.

In the guide film GF, the main area MA and the subareas SA1 and SA2 may not be fixed, but may move when a bonding process of a display panel DP is completed and a bonding process of a next display panel DP is performed. For example, the main area MA illustrated in FIG. 3 may become the second subarea SA2 as illustrated in FIG. 4 in a subsequent bonding process (i.e., a process of bonding one set of a display panel DP and a cover window CW, and bonding another set of a display panel DP and a cover window CW). The first subarea SA1 adjacent to the main area MA illustrated in FIG. 3 may become the main area MA (i.e., an attachment area of the display panel DP) in a subsequent bonding process. Whenever each display device is manufactured, the first subarea SA1 may decrease and the second subarea SA2 may increase in the entire roll-type guide film GF. Whenever each display device is manufactured, the main area MA in the guide film GF may move from a start end of the guide film GF connected to the second roller RW2 toward an end connected to the first roller RW1, and the first subarea SA1 may decrease and the second subarea SA2 may increase. A moving distance of the main area MA between the bonding process of a display panel DP and the bonding process of a next display panel DP may correspond approximately to a width of the display panel DP (e.g., substantially equal to or slightly larger than the width of the display panel DP). As in an embodiment, in case of manufacturing a display device by using the roll-type guide film GF, use efficiency of the guide film GF may be maximized, thereby reducing consumption of the guide film GF and processing time and cost.

Figure 5:
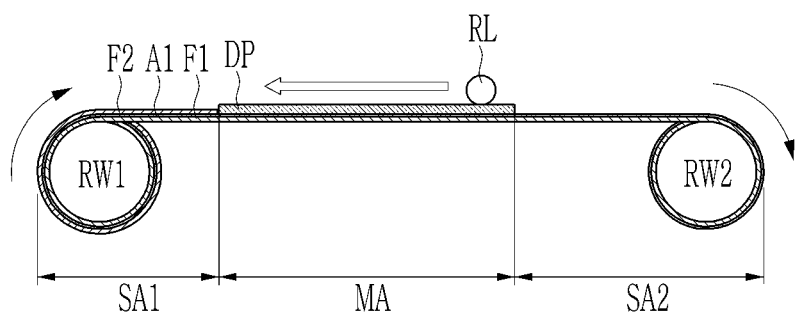
FIG. 5 to FIG. 12 schematically illustrate a manufacturing method of a display device according to an embodiment.
Figure 10:
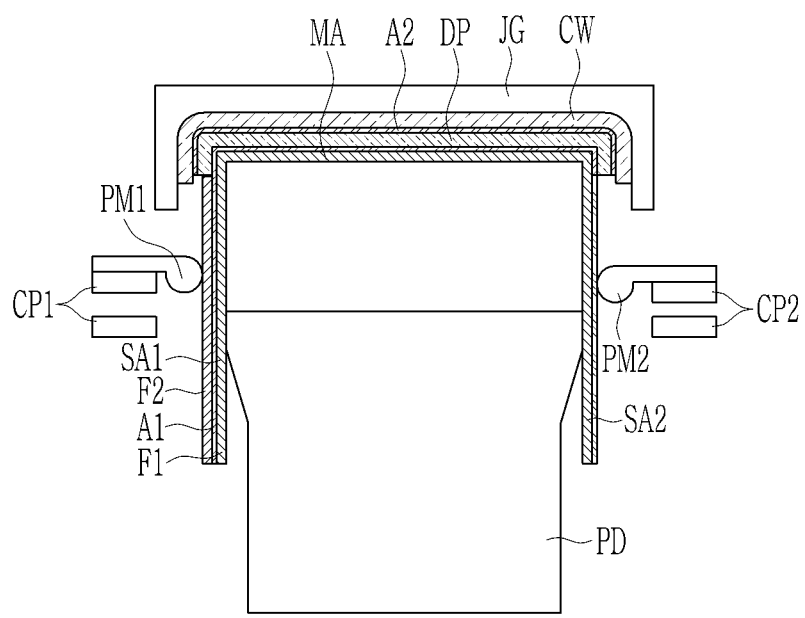
Figure 11:
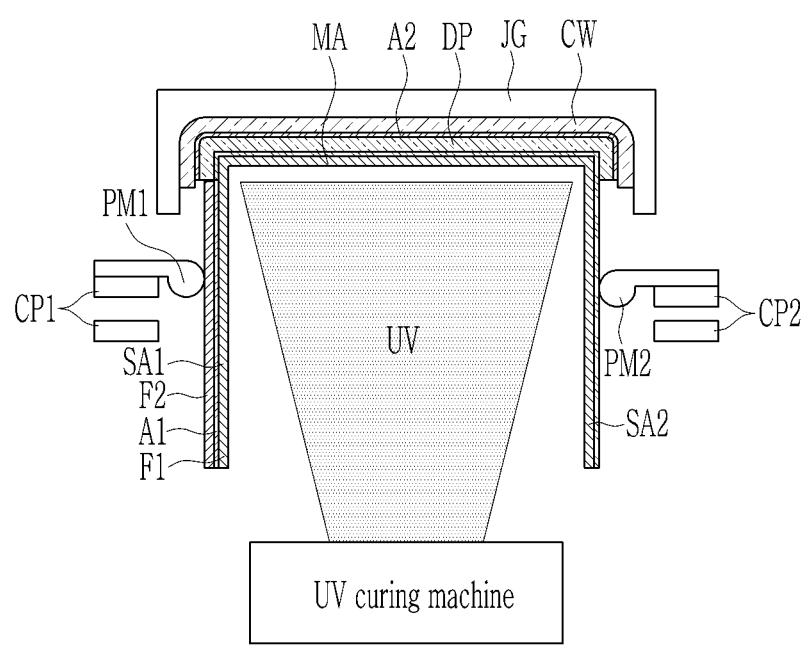
Figure 12:
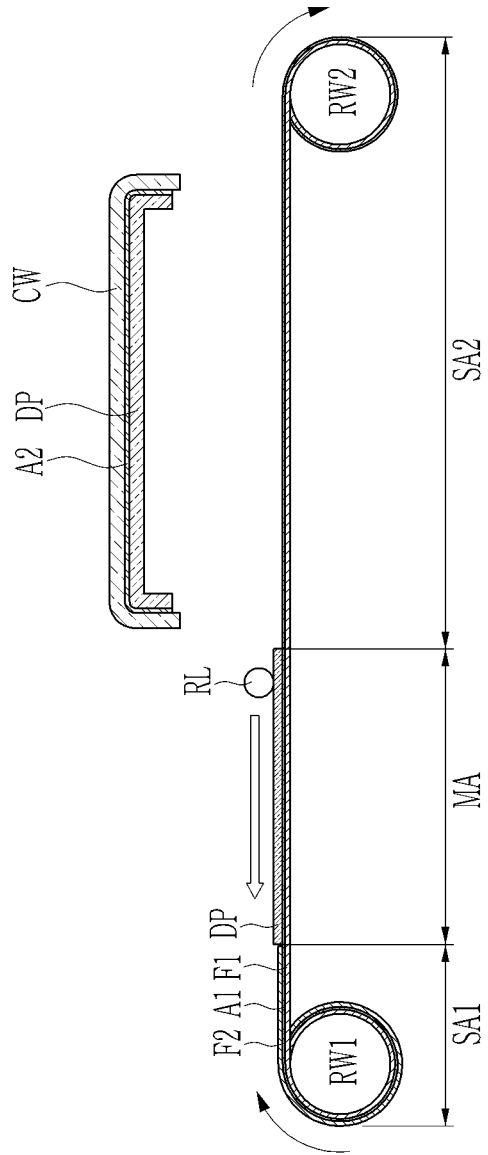

FIG. 5 to FIG. 12 schematically illustrate a manufacturing method of a display device according to an embodiment. In FIG. 5 and FIG. 12, components for bonding the guide film GF and the display panel DP are illustrated, and in FIG. 6 to FIG. 11, components for bonding the display panel DP and the cover window CW are illustrated.

Referring to FIG. 5 to FIG. 12, in a manufacturing method of a display device, in particular, a manufacturing method of bonding the display panel DP and the cover window CW and a manufacturing apparatus (equipment, system) related thereto, are illustrated. The display panel DP and the cover window CW may be bonded by using the guide film GF in a device or facility including a jig JG, a pad PD, clamps CP1 and CP2, pushing members PM1 and PM2, rollers RW1 and RW2, a lamination roller RL, etc. The lamination roller RL may be used in a subbonding process of bonding the display panel DP and the guide film GF. The jig JG, the pad PD, the clamps CP1 and CP2, and the pushing members PM1 and PM2 may be used in a main bonding process of bonding the display panel DP and the cover window CW. The rollers RW1 and RW2 may be used to provide and wind the guide film GF.

The jig JG and the pad PD may be positioned at an upper side and a lower side, respectively. The clamps CP1 and CP2 may include a first clamp CP1 and a second clamp CP2 respectively positioned at a first side (e.g., a left side) and a second side (e.g., a right side) of the pad PD. The pushing members PM1 and PM2 may include a first pushing member PM1 and a second pushing member PM2 respectively positioned at the first side and the second side of the pad PD. The pushing members PM1 and PM2 may be coupled to the clamps CP1 and CP2. The pushing members PM1 and PM2 may move together in case that the clamps CP1 and CP2 are moved. The pushing members PM1 and PM2 may each include a roller. The rollers RW1 and RW2 may include a first roller RW1 on which the guide film GF is wound before use and a second roller RW2 on which the guide film GF is wound after use. In terms of use, a starting end of the guide film GF may be connected to the second roller RW2, and an end of the guide film GF may be connected to the first roller RW1. The first roller RW1 and the second roller RW2 may be positioned at a first side and a second side of the pad PD, respectively.

A process of bonding the display panel DP and the cover window CW using the guide film GF as illustrated in FIG. 3 and FIG. 4 will be described.

Referring to FIG. 5, a step (subbonding step) of bonding the display panel DP and the guide film GF may be performed. As described above, the guide film GF may be of a roll type wound around the first roller RW1. While the guide film GF is unwound from the first roller RW1 and wound around the second roller RW2, the main area MA to be bonded to the display panel DP may be moved to a position overlapping the display panel DP. Before or after the main area MA moves to a position where it may overlap the display panel DP, the second film layer F2 may be removed or peeled off from the main area MA. In the second subarea SA2, the adhesive layer A1 may have almost lost its adhesive force. The adhesive layer A1 may not exist in the second subarea SA2. In the main area MA, an adhesive surface of the adhesive layer A1 may face a rear surface of the display panel DP at a position overlapping the display panel DP. The subbonding step may be performed by a roll lamination method. For example, the display panel DP and the guide film GF may be bonded to each other using the lamination roller RL in a state where the main area MA and the display panel DP overlap. The lamination roller RL may attach the display panel DP to the adhesive layer A1 while moving from the first side to the second side of the display panel DP, and accordingly, the rear surface of the display panel DP and the main area MA of the guide film GF may be bonded. During roll lamination, the display panel DP may be positioned between the lamination roller RL and the guide film GF, but the guide film GF may be positioned between the lamination roller RL and the display panel DP.

Figure 6:
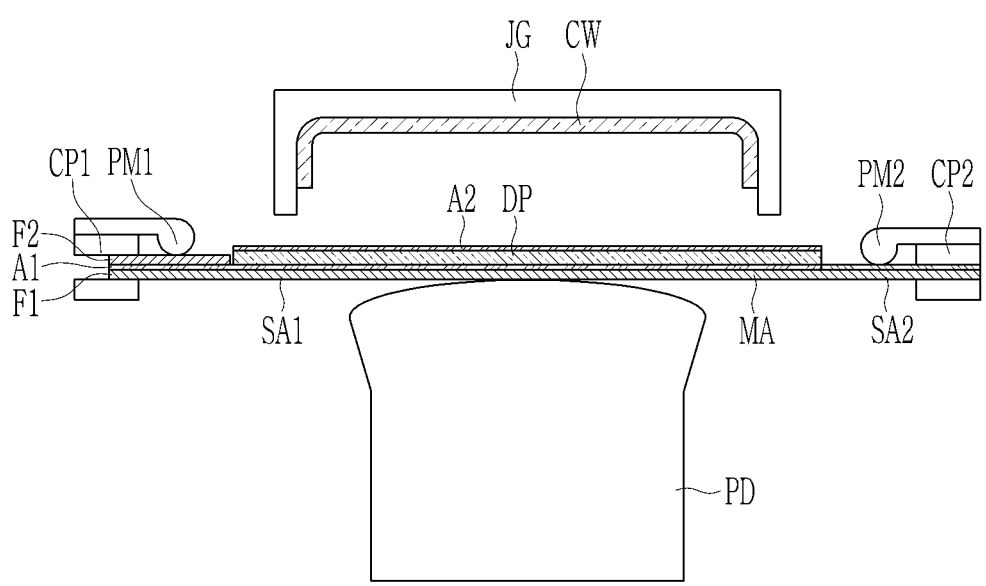

A step of forming the adhesive layer A2 as shown in FIG. 6 on a front surface of the display panel DP before or after attaching the guide film GF to the rear surface of the display panel DP may be performed. The adhesive layer A2 may be formed by attaching an adhesive in the form of a film such as an OCA, or applying or coating an adhesive such as an optically transparent resin (OCR).

Referring to FIG. 6, an operation of loading the display panel DP and the cover window CW may be performed. In the loading step, the cover window CW and the display panel DP may be overlapped. The cover window CW may be fixed to the jig JG. The jig JG may fix the cover window CW by using a vacuum adsorption means, an electrostatic chuck, or the like. The display panel DP bonded to the guide film GF may be positioned on the pad PD. The rear surface of the display panel DP may face the pad PD, and the front surface of the display panel DP and the adhesive layer A2 attached thereto may be positioned to face the cover window CW. Moving over the pad PD of the display panel DP may be performed by winding the second subarea SA2 of the guide film GF around the second roller RW2 and unwinding the first subarea SA1 of the guide film GF from the first roller RW1. In another embodiment, the rollers RW1 and RW2 and the guide film may be moved as a whole such that the display panel DP is positioned on the pad PD, or the pad PD may be moved under the display panel DP.

The subareas SA1 and SA2 may be clamped by clamps CP1 and CP2 at opposite sides of the main area MA. The guide film GF and the pad PD may be brought into contact with each other by lowering the clamps CP1 and CP2 or raising the pad PD. The first subarea SA1 may include the adhesive layer A1 but may be covered by the second film layer F2, and thus although the first clamp CP1 clamps the first subarea SA1, the first clamp CP1 may not be attached to the first subarea SA1. The second subarea SA2 may lose an adhesive force even including the adhesive layer A1, and thus even in case that the second clamp CP2 clamps the second subarea SA2, the second clamp CP2 may not be attached to the second subarea SA2.

The display panel DP and the pad PD may be aligned such that the display panel DP may be accurately loaded on the pad PD. For example, the display panel DP and the pad PD may be aligned by using a vision alignment device such that an alignment key displayed on the display panel DP and an alignment key displayed on the pad PD coincide.

Figure 7:
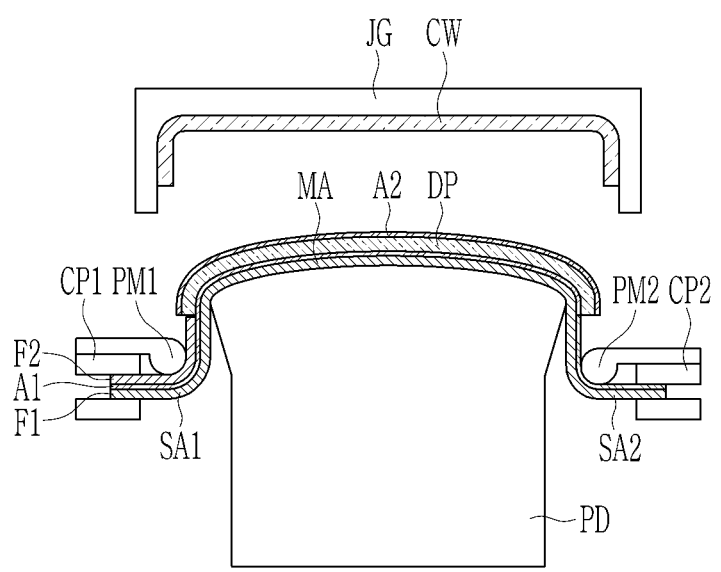

Referring to FIG. 7, a step (preforming step) of deforming a shape of the display panel DP by applying an external force to the guide film GF may be performed. The pushing members PM1 and PM2 may be positioned on the guide film GF in a state in which the guide film GF to which the display panel DP is bonded is seated on the pad PD. The display panel DP may be preformed to have a shape matching the cover window CW by applying an external force (e.g., a tensile force) to the guide film GF while adhering the guide film GF to a side surface of the pad PD using the pushing members PM1 and PM2. More specifically, the first pushing member PM1 may be positioned in the first subarea SA1, and the second pushing member PM2 may be positioned in the second subarea SA2. An external force may be applied to the first subarea SA1 including the first film layer F1, the adhesive layer A1, and the second film layer F2 through the first pushing member PM1, and an external force may be applied to the second subarea SA2 including the first film layer F1 and the adhesive layer A1 through the second pushing member PM2.

The external forces by the pushing members PM1 and PM2 may be applied by lowering the clamps CP1 and CP2 coupled thereto or by raising the pad PD on which the guide film GF is seated. Since the first subarea SA1 may include the adhesive layer A1 but may be covered by the second film layer F2, there is no problem in applying the external force to the first pushing member PM1 in close contact with the first subarea SA1. Since the second subarea SA2 may lose an adhesive force even including the adhesive layer A1, there is no problem in applying an external force to the second pushing member PM2 in close contact with the second subarea SA2. The guide film GF may be bent through an external force applied to the guide film GF. For example, the main area MA of the guide film GF may be deformed to have a curvature. In case that the guide film GF is deformed, the display panel DP bonded to the main area MA may also be deformed. For example, the display panel DP may be deformed to include the bending areas BA1 and BA2 as illustrated in FIG. 1.

After the preforming step, a step of aligning the display panel DP and the cover window CW may be performed such that the display panel DP and the cover window CW may be accurately attached to each other. For example, the display panel DP and the cover window CW may be aligned such that the alignment key displayed on the display panel DP matches the alignment key displayed on the cover window CW by using the vision alignment device.

Figure 8:
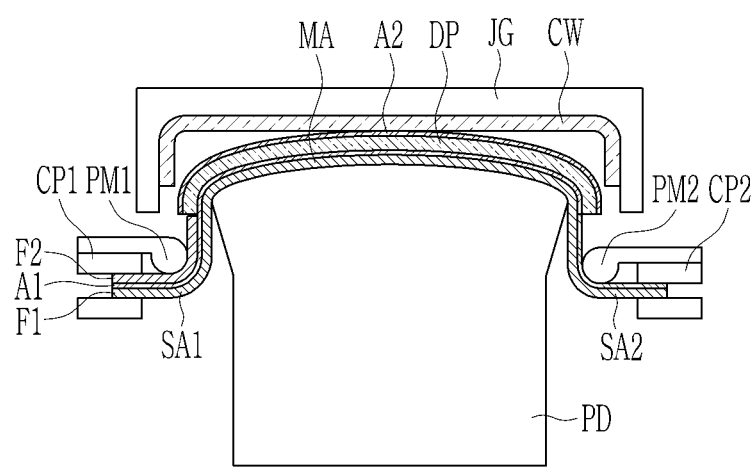
Figure 9:
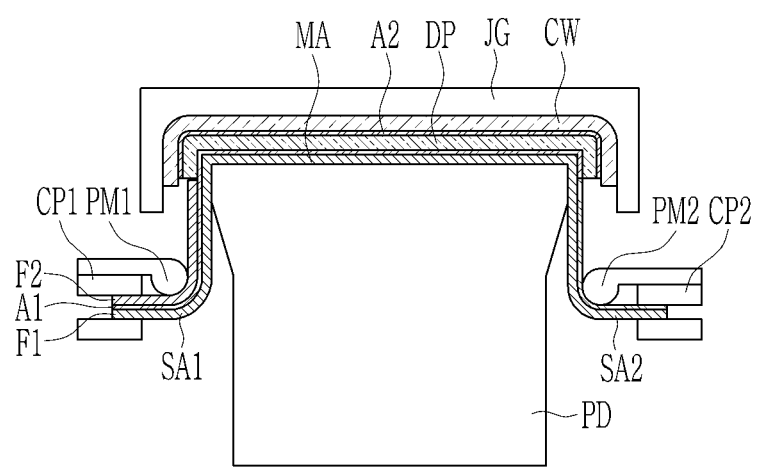

Referring to FIG. 8 and FIG. 9, a step of bonding the cover window CW by the display panel DP (a main bonding step) may be performed. First, referring to FIG. 8, the adhesive layer A2 positioned in a central region of the display panel DP may be in contact with the cover window CW by raising the pad PD, lowering the jig JG, or raising the pad PD and lowering the jig JG. The display panel DP may be maintained to be preformed or an external force may be applied to the guide film GF such that the adhesive layer A2 does not contact the cover window CW in a bending area of the display panel DP. This is because, when the adhesive layer A2 of the bending area first contacts the cover window CW, bonding quality may be deteriorated, such as air bubbles being generated between the display panel DP and the cover window CW.

Referring to FIG. 9, the display panel DP and the cover window CW may be bonded together by pressing the display panel DP through the pad PD in a state in which the adhesive layer A2 is in contact with the cover window CW. First, the flat area (e.g., the flat area FA in FIG. 1) of the display panel DP is bonded to the cover window CW, and the bending areas (e.g., bending areas BA1 and BA2 in FIG. 1) of the display panel DP may be bonded to the cover window CW. The pad PD may include or may be connected to an air pump. The pad PD may include a diaphragm. An external force applied to the guide film GF may be applied until the bending area of the display panel DP is adhered to the window. During bonding, a magnitude or direction of a tensile force of the guide film GF may be adjusted.

Referring to FIG. 10, the pad PD may be separated from the pass panel DP and the guide film GF by lowering the pad PD, raising the jig JG, or lowering the pad PD and raising the jig JG. Thereafter, the jig JG and the pad PD may be positioned so as to not overlap. The display panel DP and the cover window CW that are bonded may be positioned in the jig JG. The guide film GF may be in a state in which the main area MA is bonded to the rear surface of the display panel DP.

Referring to FIG. 11, a step of separating the guide film GF from the display panel DP may be performed. An adhesive force of the adhesive layer A1 to which the guide film GF and the display panel DP are attached may be reduced or lost in case irradiated with ultraviolet (UV) light. By irradiating UV rays to the main area MA of the guide film GF using a UV curing machine, the adhesive force of the adhesive layer A1 positioned in the main area MA bonded to the display panel DP may be removed, and the guide film GF may be separated from the display panel DP. An ultraviolet irradiation area may be set such that ultraviolet rays are not irradiated to the first subarea SA1 of the guide film GF. This is because, in case that UV rays are irradiated to the first subarea SA1, the adhesive layer A1 of the first subarea SA1 to be used for attaching the display panel DP may lose an adhesive force or may have reduced adhesive force in a manufacturing process for another display device. The adhesive layer A2 to which the display panel DP and the cover window CW are attached may be cured by UV irradiation for removal of the guide film GF, or by UV irradiation after separating the guide film GF.

Referring to FIG. 12, the display device to which the display panel DP and the cover window CW are bonded may be unloaded from the jig JG, thereby completing a manufacturing process of the display device. After the manufacturing process of a display device is completed, the guide film GF may be unwound from the first roller RW1 by a cell area for manufacturing another display device (e.g., approximately by a width of the display panel DP, or approximately by a width of the main area MA), and may be wound around the second roller RW2. The cell area may correspond to at least the main area (i.e., an attachment area) in consideration of a process margin such as an attachment tolerance, and the cell area may have a greater width than the width of the display panel DP. Accordingly, upon manufacture of a display device, the main area MA bonded to the display panel DP may become the second subarea SA2, and the first subarea SA1 adjacent to a first side of the main area MA may become the main area MA, so that the second film layer F2 may be removed or peeled off and bonded to another display panel DP. For example, the first subarea SA1 adjacent to the first side of the main area MA may be used as an area to which another display panel DP is attached to manufacture another display device.

Although a process of forming the adhesive layer A2 on a front surface of the display panel DP and bonding the display panel DP to the cover window CW has been described, the adhesive layer A2 may be formed on a rear surface of the cover window CW.

Figure 13:
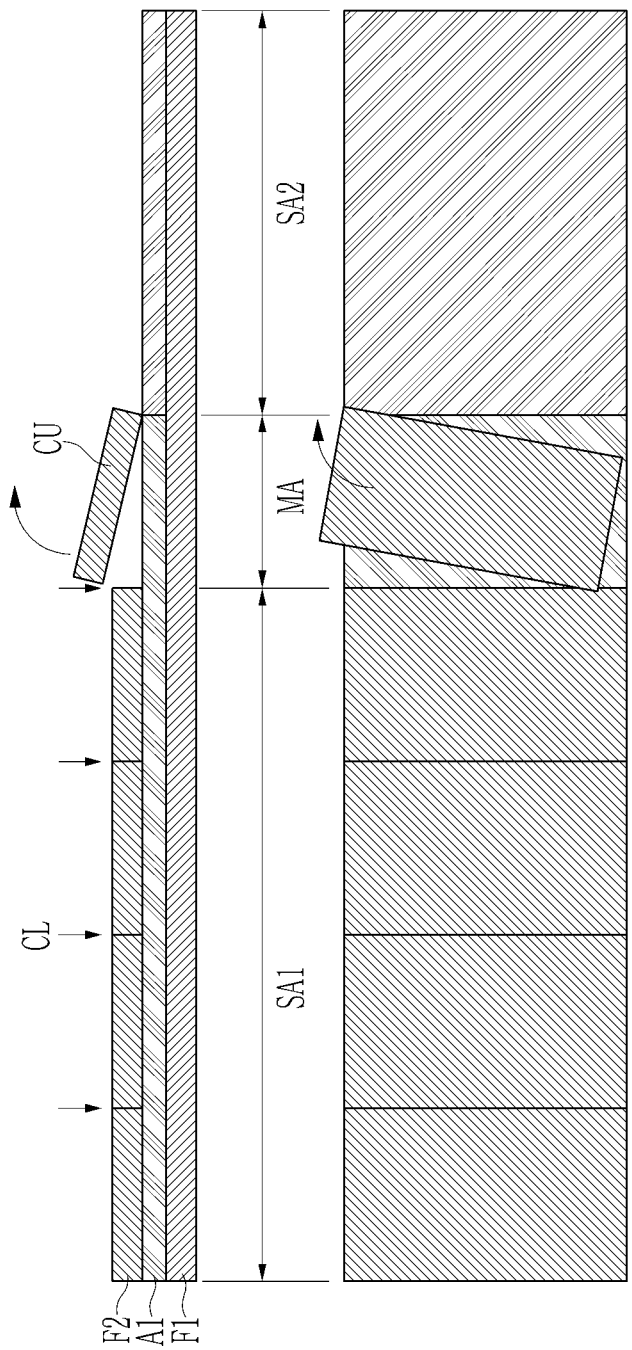
FIG. 13 illustrates a schematic cross-sectional view and a schematic plan view schematically showing a guide film according to an embodiment.

FIG. 13 illustrates a schematic cross-sectional view and a schematic plan view schematically showing a guide film according to an embodiment.

Referring to FIG. 13, the guide film GF may include a first film layer F1, an adhesive layer A1, and a second film layer F2. The second film layer F2 may be cut along a cutting line CL to be removable or peelable in a cell unit CU. Herein, the cell unit CU may correspond to a display panel DP attached to the main area MA of the guide film GF, and a width (horizontal direction) of the cell unit CU may be greater than a width of the display panel DP in consideration of the process margin. The guide film GF may be wound on the first roller RW1 in a state in which the second film layer F2 is cut in the cell unit CU and attached to the adhesive layer A1. As described above, after the manufacture of a display device, when a next display device is manufactured, the main area MA bonded to the display panel DP may be moved to one side by the cell area approximately corresponding to the width of the display panel DP. Since a new main area MA may be covered by the second film layer F2, the second film layer F2 must be removed to expose the adhesive layer A1 in order to attach the display panel DP. As in the embodiment, in case that the second film layer F2 uses the roll-type guide film GF cut in the cell unit CU, the second film layer F2 may be readily removed from the main area MA and the process time may be shortened in continuously performing the process of bonding the display panel DP and the cover window CW.

The second film layer F2 may be completely cut in the cell unit CU, or may be partially cut in the cell unit CU. As an example in which it is partially cut, it may be cut to a predetermined or selected depth along the cutting line CL from one or opposite sides of the second film layer F2, and it may include a portion in which a perforated line is formed in the second film layer F2 along the cutting line CL like a stamp. For ease of peeling of the second film layer F2 cut in the cell unit CU, a peeling protrusion (e.g., a portion that a user can readily hold with a hand or instrument) may be formed on one side of the second film layer F2 for each cell unit CU, or a peeling tape may be attached thereto.

Figure 14:
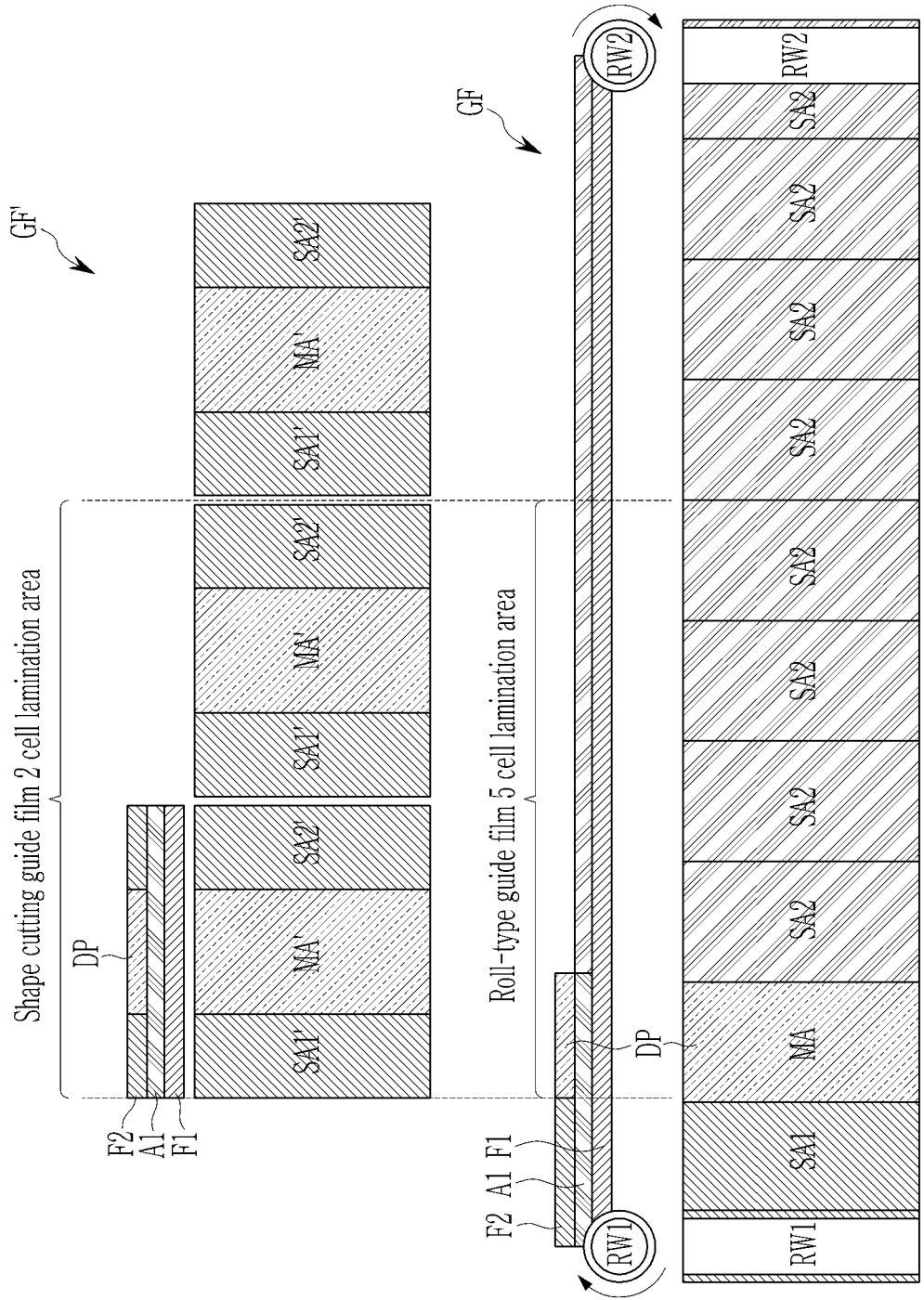
FIG. 14 illustrates a schematic view comparing areas of a guide film used in manufacturing a display device.

FIG. 14 illustrates a schematic view comparing areas of a guide film used in manufacturing a display device.

Referring to FIG. 14, an upper view shows a comparative shape cutting guide film GF' cut to match a shape of each display panel DP, and a lower view shows a roll-type guide film GF that may be continuously used for multiple display panels DP as in an embodiment.

Similar to the roll-type guide film GF, the comparatively cut guide film GF' may include a main area MA' to which the display panel DP is attached and a first sub-area SA1' and a second sub-area SA2' positioned at a first side and a second side thereof. A width of each of the areas SA1' and SA2' may be narrower than that of the main area MA', and it may have a predetermined or selected width for clamping by the aforementioned clamps CP1 and CP2 and application of an external force by the pushing members PM1 and PM2. However, after manufacturing a display device, the guide film GF' may be reused. Unlike the roll-type guide film GF according to an embodiment, an area to which an external force may be applied does not exist on one side of the first subarea SA1', so that the first subarea SA1' cannot be used as the main area MA'.

In the guide film GF according to an embodiment, the first subarea SA1 may be used as the main area MA when a subsequent display device is manufactured, and thus more display devices than in the comparative guide film GF' can be manufactured with a same area. For example, in the guide film GF according to an embodiment, about five display devices may be manufactured with an area of two comparative guide films GF'. Accordingly, since usage of the guide film GF may be reduced, a cost thereof may be reduced. Since it does not require a process step for shape processing like the shape cutting guide film GF', process time and cost may be reduced.

Figure 15:
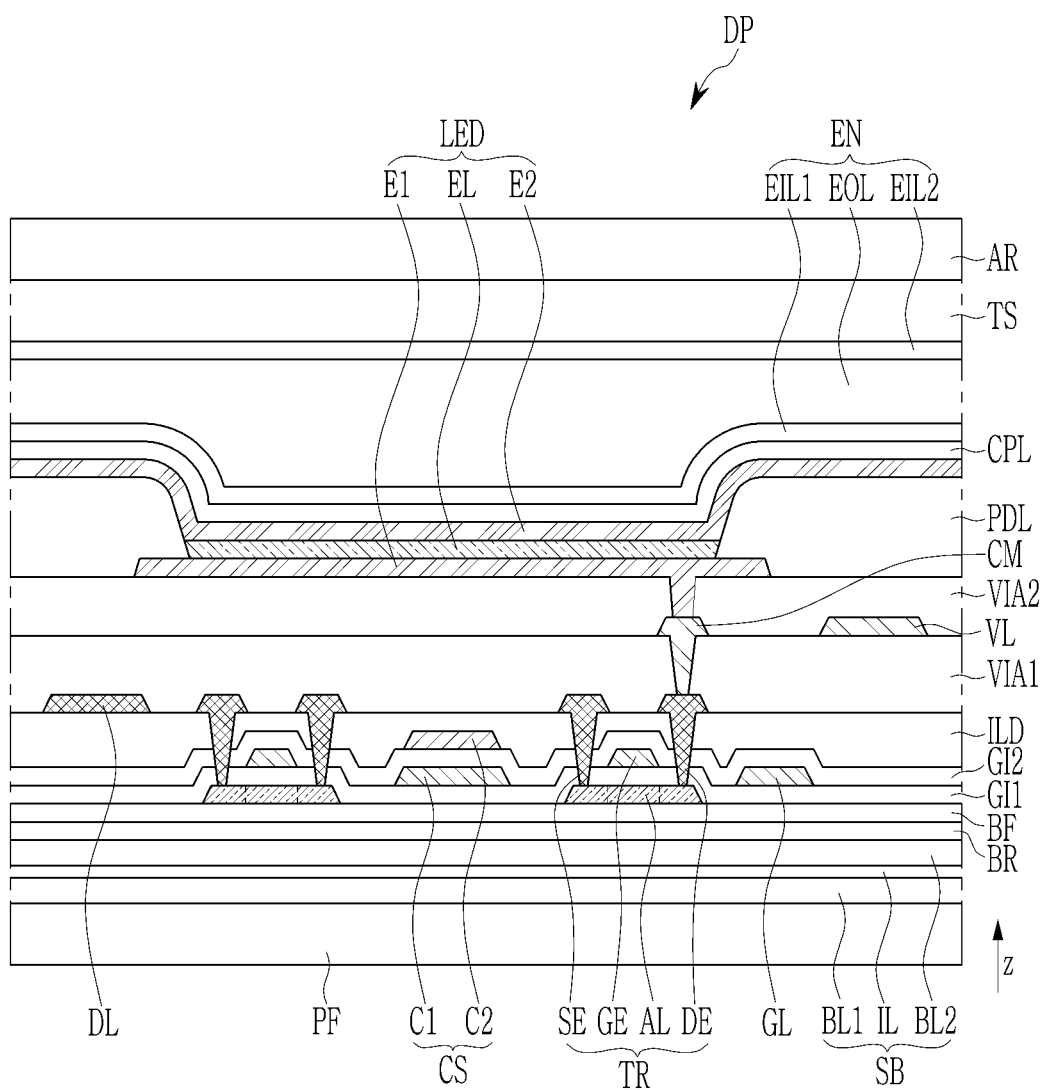
FIG. 15 illustrates a schematic cross-sectional view showing a stacked structure of a display panel according to an embodiment.

FIG. 15 illustrates a schematic cross-sectional view showing a stacked structure of a display panel according to an embodiment. The cross-section illustrated in FIG. 15 may correspond to approximately one pixel area.

Referring to FIG. 15, the display panel DP that may be bonded to the cover window CW using the above-described guide film GF may include a substrate SB, a transistor TR formed on the substrate SB, and a light emitting diode LED connected to the transistor TR. The light emitting diode LED may correspond to the pixel.

The substrate SB may be a flexible substrate SB capable of bending, folding, rolling, or the like. The substrate SB may be a multilayer including a first base layer BL1, an inorganic layer IL, and a second base layer BL2. The first base layer BL1 and the second base layer BL2 may each include a polymer resin such as polyimide (PI), polyamide (PA), and/or polyethylene terephthalate (PET). A barrier layer BR that prevents moisture and oxygen from penetrating the substrate SB may be disposed. The buffer layer BR may include an inorganic insulating material such as a silicon nitride ($SiN_x$), a silicon oxide ($SiO_x$), and/or a silicon oxynitride ($SiO_xN_y$), and may be a single layer or multiple layers.

A buffer layer BF may be disposed on the barrier layer BR. The buffer layer BF may improve a characteristic of the semiconductor layer by blocking impurities from the substrate SB when the semiconductor layer is formed, and may flatten a surface of the substrate SB to relieve a stress of the semiconductor layer. The buffer layer BF may include an inorganic insulating material such as a silicon nitride, a silicon oxide, and/or a silicon oxynitride, and may be a single layer or multiple layers. The buffer layer BF may include amorphous silicon (a-Si).

A semiconductor layer AL of a transistor TR may be disposed on the buffer layer BF. The semiconductor layer AL may include a first region and a second region, and a channel region therebetween. The semiconductor layer AL may include at least one of amorphous silicon, polysilicon, and an oxide semiconductor. The oxide semiconductor may include at least one of zinc (Zn), indium (In), gallium (Ga), and tin (Sn). For example, the semiconductor layer AL may include a low-temperature polycrystalline silicon (LTPS) or indium-gallium-zinc oxide (IGZO).

A first gate insulating layer GI1 may be disposed on the semiconductor layer AL. The first gate insulating layer GI1 may include an inorganic insulating material such as a silicon nitride, a silicon oxide, and/or a silicon oxynitride, and may be a single layer or multiple layers.

The first gate conductive layer, which may include a gate electrode GE of the transistor TR, a gate line GL, and a first electrode C1 of a storage capacitor CS, may be disposed on the first gate insulating layer GI1. The first gate conductive layer may include molybdenum (Mo), aluminum (Al), copper (Cu), titanium (Ti), and/or the like, and may be a single layer or multiple layers.

A second gate insulating layer GI2 may be disposed on the first gate conductive layer. The second gate insulating layer GI2 may include an inorganic insulating material such as a silicon nitride, a silicon oxide, and/or a silicon oxynitride, and may be a single layer or multiple layers.

A second gate conductive layer that may include a second electrode C2 of the storage capacitor CS and the like may be disposed on the second gate insulating layer GI2. The second gate conductive layer may include molybdenum (Mo), aluminum (Al), copper (Cu), titanium (Ti), and/or the like, and may be a single layer or multiple layers.

An interlayer insulating layer ILD may be disposed on the second gate insulating layer GI2 and the second gate conductive layer. The interlayer insulating layer ILD may include an inorganic insulating material such as a silicon nitride, a silicon oxide, and/or a silicon oxynitride, and may be a single layer or multiple layers.

A first data conductive layer that may include a first electrode SE and a second electrode DE, a data line DL, and the like of the transistor TR may be disposed on the interlayer insulating layer ILD. The first electrode SE and the second electrode DE may be respectively connected to a first region and a second region of the semiconductor layer AL through contact holes of the insulating layers GI1, GI2, and ILD. One of the first electrode SE and the second electrode DE may serve as a source electrode, and the other may serve as a drain electrode. The first data conductive layer may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), copper (Cu), and/or the like, and may be a single layer or multiple layers.

A first planarization layer VIAL may be disposed on the first data conductive layer. The first planarization layer VIAL may include an organic insulating material such as a general purpose polymer such as polymethyl methacrylate (PMMA), polystyrene (PS), a polymer derivative having a phenolic group, an acrylic polymer, an imide-based polymer (e.g., polyimide (PI)), and/or a siloxane-based polymer.

A second data conductive layer, which may include a voltage line VL, a connecting member CM, and the like, may be disposed on the first planarization layer VIA1. The voltage line VL may transfer voltages such as a driving voltage, a common voltage, an initialization voltage, and a reference voltage. The connecting member CM may be connected to the second electrode DE of the transistor TR through a contact hole of the first planarization layer VIA1. The second data conductive layer may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), copper (Cu), and/or the like, and may be a single layer or multiple layers.

A second planarization layer VIA2 may be disposed on the second data conductive layer. The second planarization layer VIA2 may include an organic insulating material, e.g., a general purpose polymer such as poly(methyl methacrylate) (PMMA) or polystyrene (PS), a polymer derivative having a phenolic group, an acrylic polymer, an imide-based polymer, and/or a siloxane-based polymer.

A first electrode E1 of the light emitting diode LED may be disposed on the second planarization layer VIA2. The first electrode E1 may be referred to as a pixel electrode. The first electrode E1 may be connected to the connecting member CM through a contact hole formed in the second planarization layer VIA2. Accordingly, the first electrode E1 may be electrically connected to the second electrode DE of the transistor TR to receive a driving current for controlling luminance of the light emitting diode LED. The transistor TR to which the first electrode E1 is connected may be a driving transistor or a transistor that is electrically connected to the driving transistor. The first electrode E1 may be formed of a reflective conductive material or a translucent conductive material, or may be formed of a transparent conductive material. The first electrode E1 may include a transparent conductive material such as an indium tin oxide (ITO) or an indium zinc oxide (IZO). The first electrode E1 may include a metal such as lithium (Li), calcium (Ca), aluminum (Al), silver (Ag), magnesium (Mg), or gold (Au), and/or a metal alloy.

A pixel defining layer PDL may be positioned on the second planarization layer VIA2 and the first electrode E1. The pixel defining layer PDL may be referred to as a bank or a partition wall, and may have an opening overlapping the first electrode E1. The pixel defining layer PDL may include an organic insulating material, e.g., a general purpose polymer such as poly(methyl methacrylate) (PMMA) or polystyrene (PS), a polymer derivative having a phenolic group, an acrylic polymer, an imide-based polymer, and/or a siloxane-based polymer.

An emission layer EL of the light emitting diode LED may be disposed on the first electrode E1. In addition to the emission layer EL, a functional layer including at least one of a hole injection layer, a hole transport layer, an electron transport layer, and an electron injection layer may be disposed on the first electrode E1.

A second electrode E2 of the light emitting diode LED may be disposed on the emission layer EL. The second electrode E2 may be referred to as a common electrode. The second electrode E2 may be made of a low work function metal such as calcium (Ca), barium (Ba), magnesium (Mg), aluminum (Al), silver (Ag), and/or a metal alloy, as a thin layer to have light transmittance. The second electrode E2 may include a transparent conductive oxide such as an indium tin oxide (ITO) or an indium zinc oxide (IZO).

The first electrode E1, the emission layer EL, and the second electrode E2 of each pixel may constitute a light emitting diode LED, such as an organic light emitting diode. The first electrode E1 may serve as an anode, and the second electrode E2 may serve as a cathode. An emission region of the light emitting diode LED may correspond to a pixel.

A capping layer CPL may be disposed on the second electrode E2. The capping CPL may improve light efficiency by adjusting a refractive index. The capping layer CPL may be disposed to entirely cover the second electrode E2. The capping layer CPL may include an organic insulating material, or may include an inorganic insulating material.

An encapsulation layer EN may be disposed on the capping layer CPL. The encapsulation layer EN may encapsulate a light emitting diode LED to prevent moisture or oxygen from penetrating from the outside. The encapsulation layer EN may be a thin film encapsulation layer in which the organic layer EOL is positioned between the first inorganic layer EIL1 and the second inorganic layer EIL2.

A touch sensor layer TS including touch electrodes may be disposed on the encapsulation layer EN. An anti-reflection layer AR for reducing external light reflection may be disposed on the touch sensor layer TS.

A protective film PF may be positioned under the substrate SB. The protective film PF may protect the display panel DP in a manufacturing process of the display device. The protective film PF may include a polymer such as polyethylene terephthalate (PET), a silicone-based polymer (e.g., polydimethylsiloxane (PDMS)), and/or an elastomer (e.g., elastomeric polyurethane (EPU)).

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure.

What is claimed is:

1. A manufacturing method of a display device, comprising:
   providing a guide film wound around a first roller;
   positioning an attachment area of the guide film to overlap a display panel;
   bonding the guide film and the display panel;
   positioning the display panel bonded to the guide film to overlap a cover window;
   bonding the display panel and the cover window;
   separating the guide film from the display panel; and
   winding the guide film around a second roller by at least an area corresponding to the attachment area.

2. The manufacturing method of claim 1, wherein the guide film includes:
   a first film layer;
   a second film layer; and
   an adhesive layer between the first film layer and the second film layer, and
   the positioning of the attachment area to overlap the display panel includes removing the second film layer from the attachment area.

3. The manufacturing method of claim 2, wherein the second film layer is removably cut in a cell unit.

4. The manufacturing method of claim 2, wherein the guide film includes:
   a main area corresponding to the attachment area;
   a first subarea disposed at a first side of the main area; and
   a second subarea disposed at a second side of the main area, and
   the second film layer is not disposed in the main area and the second subarea.

5. The manufacturing method of claim 4, wherein an adhesive force of the adhesive layer is reduced or eliminated in the second subarea.

6. The manufacturing method of claim 4, further comprising
   removing the second film layer from the first subarea adjacent to the main area after the winding of the guide film around the second roller.

7. The manufacturing method of claim 6, wherein the first subarea from which the second film layer is removed is used as an attachment area of another display panel.

8. The manufacturing method of claim 4, wherein the separating of the guide film from the display panel includes irradiating ultraviolet rays to the main area, and
   an ultraviolet irradiation area is set such that the ultraviolet rays are not irradiated to the first subarea in the irradiating of the ultraviolet rays.

9. The manufacturing method of claim 1, wherein the bonding of the display panel and the cover window includes:
   positioning the display panel bonded to the guide film on a pad; and
   fixing the cover window to a jig.

10. The manufacturing method of claim 9, wherein the bonding of the display panel and the cover window includes preforming the display panel by applying an external force to the guide film.

11. A manufacturing method of a display device, comprising:
    providing a guide film, including a first film layer, an adhesive layer, and a second film layer, wound around a first roller;
    physically connecting a first end of the guide film with a second roller;
    bonding a first attachment area of the guide film to a first display panel;
    bonding the first display panel bonded to the guide film to a first cover window;
    separating the guide film from the first display panel; and
    winding a portion of the guide film around the second roller.

12. The manufacturing method of claim 11, further comprising
    bonding a second attachment region of the guide film to a second display panel after the winding of the portion of the guide film around the second roller.

13. The manufacturing method of claim 11, wherein the second film layer is removably cut in a cell unit corresponding to the first display panel.

14. The manufacturing method of claim 11, wherein the guide film includes:
    a main area corresponding to the first attachment area;
    a first subarea extending from a first side of the main area; and
    a second subarea extending from a second side of the main area, and
    the second film layer is not disposed in the main area and the second subarea.

15. The manufacturing method of claim 14, wherein an adhesive force of the adhesive layer is reduced or eliminated in the second subarea.

16. The manufacturing method of claim 14, further comprising
    removing the second film layer from the first subarea adjacent to the main area after the winding of the portion of the guide film around the second roller.

17. The manufacturing method of claim 16, wherein the first subarea from which the second film layer is removed is used as a second attachment area for bonding a second display panel.

18. The manufacturing method of claim 14, wherein
the separating of the guide film from the first display panel
includes irradiating ultraviolet rays to the main area, and
an ultraviolet irradiation area is set such that the ultraviolet rays are not irradiated to the first subarea in the irradiating of the ultraviolet rays.

19. The manufacturing method of claim 11, wherein
the bonding of the first display panel and the first cover window includes:
positioning the first display panel bonded to the first attachment area on a pad; and
fixing the first cover window to a jig.

20. The manufacturing method of claim 19, wherein
the bonding of the first display panel and the first cover window includes preforming the first display panel by applying an external force to the guide film.

* * * * *